US010455048B2

United States Patent
Singamsetty et al.

(10) Patent No.: US 10,455,048 B2
(45) Date of Patent: Oct. 22, 2019

(54) SECURED AND SEALED PORTABLE WIRELESS DATA STORAGE SYSTEM

(71) Applicants: Suresh Kumar Singamsetty, Aliso Viejo, CA (US); Dennis Ching Chung Kwan, San Diego, CA (US)

(72) Inventors: Suresh Kumar Singamsetty, Aliso Viejo, CA (US); Dennis Ching Chung Kwan, San Diego, CA (US)

(73) Assignee: WISILICA INC., Laguna Hills, CA (US)

(*) Notice: Subject to any disclaimer, the term of this patent is extended or adjusted under 35 U.S.C. 154(b) by 0 days.

(21) Appl. No.: 14/696,346

(22) Filed: Apr. 24, 2015

(65) Prior Publication Data
US 2019/0028564 A1    Jan. 24, 2019

Related U.S. Application Data

(60) Provisional application No. 61/983,906, filed on Apr. 24, 2014.

(51) Int. Cl.
| H04L 29/08 | (2006.01) |
| H04W 8/24 | (2009.01) |
| H04W 12/06 | (2009.01) |
| G06F 21/31 | (2013.01) |
| H04L 29/06 | (2006.01) |
| G06F 21/34 | (2013.01) |
| G06F 21/44 | (2013.01) |

(52) U.S. Cl.
CPC .......... *H04L 67/303* (2013.01); *G06F 21/31* (2013.01); *G06F 21/34* (2013.01); *G06F 21/44* (2013.01); *H04L 63/0861* (2013.01); *H04L 63/205* (2013.01); *H04L 67/1097* (2013.01); *H04W 8/24* (2013.01); *H04W 12/06* (2013.01); *H04L 69/24* (2013.01)

(58) Field of Classification Search
CPC ..................................................... H04L 67/303
USPC .......................................................... 709/228
See application file for complete search history.

(56) References Cited

U.S. PATENT DOCUMENTS

| 8,706,627 | B2 * | 4/2014 | Shore .................... G06Q 20/04 705/41 |
| 9,454,493 | B1 * | 9/2016 | Adogla ............... G06F 21/6209 |
| 9,876,788 | B1 * | 1/2018 | Ziraknejad .............. G06F 21/45 |
| 2004/0267697 | A1 * | 12/2004 | Hamidi ................... G06F 16/10 |
| 2006/0209886 | A1 * | 9/2006 | Silberman ............ H01R 31/065 370/466 |

(Continued)

OTHER PUBLICATIONS

Merriam-Webster, "hermetically", 2018 (Year: 2018).*

(Continued)

*Primary Examiner* — Ondrej C Vostal
(74) *Attorney, Agent, or Firm* — RowanTELS LLC

(57) ABSTRACT

A method for storing large amounts of data on a wireless device, said method comprising the steps of placing a wireless device on a wireless transmission unit; initializing the wireless device for transmission of data; authenticating the wireless device with an associated account or profile; verifying the storage capacity of the wireless device; determining what wireless standard is implemented by the device; and transmitting data to the wireless device; whereby the transmitted information may be later viewed and or accessed locally from the wireless device.

14 Claims, 10 Drawing Sheets

(56) References Cited

U.S. PATENT DOCUMENTS

| | | | |
|---|---|---|---|
| 2008/0154404 A1* | 6/2008 | Kedem | G11B 25/10 700/94 |
| 2008/0242280 A1* | 10/2008 | Shapiro | H04N 21/25891 455/414.3 |
| 2008/0308626 A1* | 12/2008 | Harper | G06K 19/08 235/380 |
| 2010/0332866 A1* | 12/2010 | Lee | G06F 1/3203 713/300 |
| 2011/0125765 A1* | 5/2011 | Tuli | G06F 17/30035 707/751 |
| 2012/0050151 A1* | 3/2012 | Dabov | H05K 5/061 345/156 |
| 2012/0091819 A1* | 4/2012 | Kulikowski | G06F 1/266 307/104 |
| 2012/0229076 A1* | 9/2012 | Zhu | H04L 25/02 320/107 |
| 2012/0303768 A1* | 11/2012 | Fiennes | H04N 21/4126 709/220 |
| 2012/0308008 A1* | 12/2012 | Kondareddy | H04L 63/0471 380/273 |
| 2013/0086409 A1* | 4/2013 | Lu | H04L 12/2807 713/340 |
| 2013/0138799 A1* | 5/2013 | Sanchez Velez | G06F 1/3209 709/224 |
| 2013/0152174 A1* | 6/2013 | Raley | G06F 21/31 726/4 |
| 2013/0201316 A1* | 8/2013 | Binder | H04L 67/12 348/77 |
| 2013/0215756 A1* | 8/2013 | Jeon | H04L 67/2852 370/238 |
| 2013/0228628 A1* | 9/2013 | Bona | G06K 19/06 235/488 |
| 2014/0214512 A1* | 7/2014 | Bachman | G06Q 30/0222 705/14.23 |
| 2014/0285967 A1* | 9/2014 | Wikander | G06F 1/1656 361/679.54 |
| 2014/0335490 A1* | 11/2014 | Baarman | A61B 5/002 434/236 |
| 2015/0270719 A1* | 9/2015 | Kurs | H02J 5/005 320/108 |
| 2015/0370915 A1* | 12/2015 | Kim | H04L 67/02 370/311 |
| 2016/0055918 A1* | 2/2016 | Kochar | G11C 16/3445 365/185.11 |
| 2016/0072335 A1* | 3/2016 | Isotalo | H02J 50/10 320/108 |
| 2017/0237278 A1* | 8/2017 | Zhang | H02J 7/0042 320/108 |
| 2017/0331335 A1* | 11/2017 | Brooks | H02J 50/90 |

OTHER PUBLICATIONS

Ziraknejad, "User Enrollment and Authentication", U.S. Appl. No. 61/931,347, Jan. 2014 (Year: 2014).*
ISO/IEC, "ISO/IEC 7810 Identification Cards Physical Characteristics", RFIDCard, 2019 (Year: 2019).*
Wikipedia, "MiniCard", 2019 (Year: 2019).*

* cited by examiner

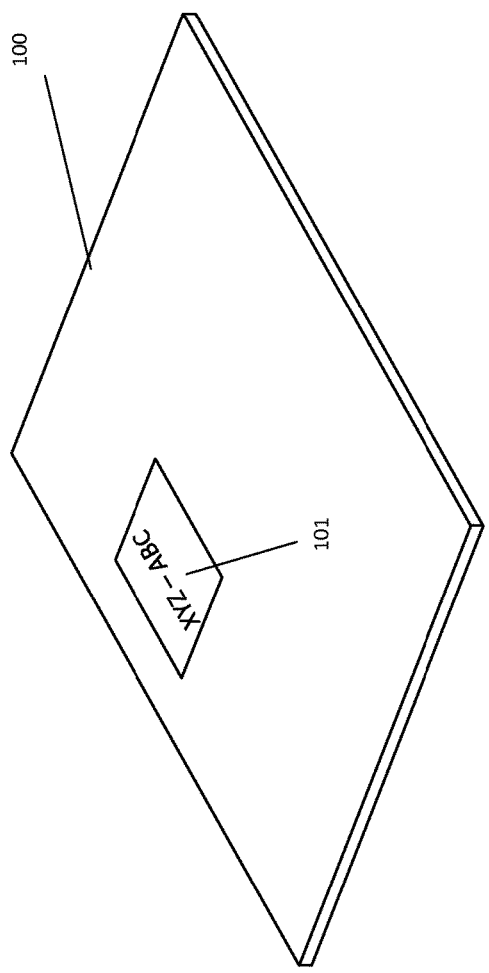
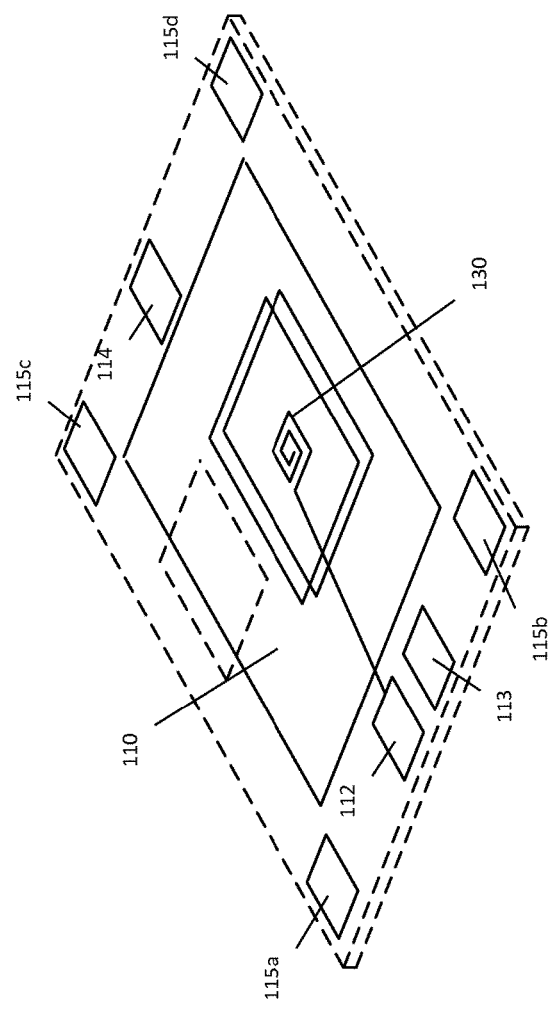

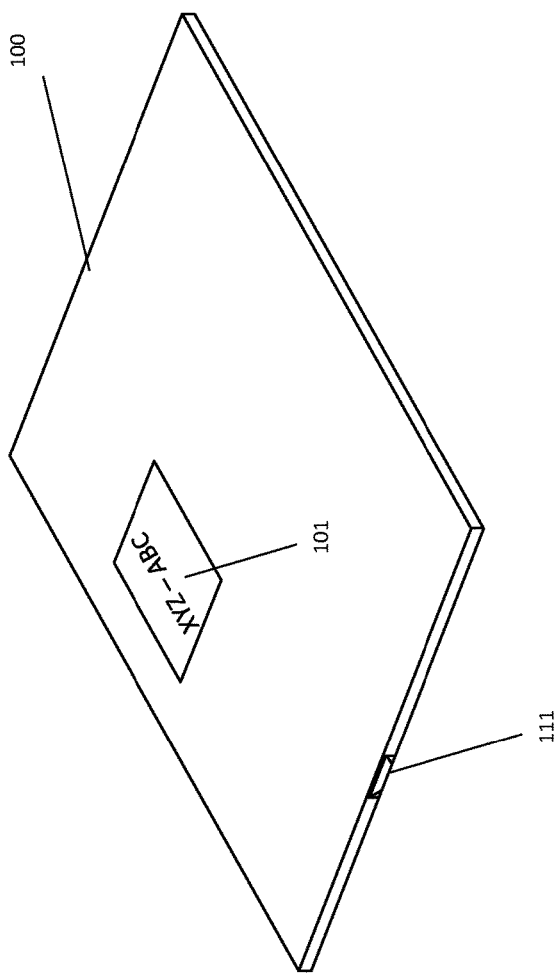
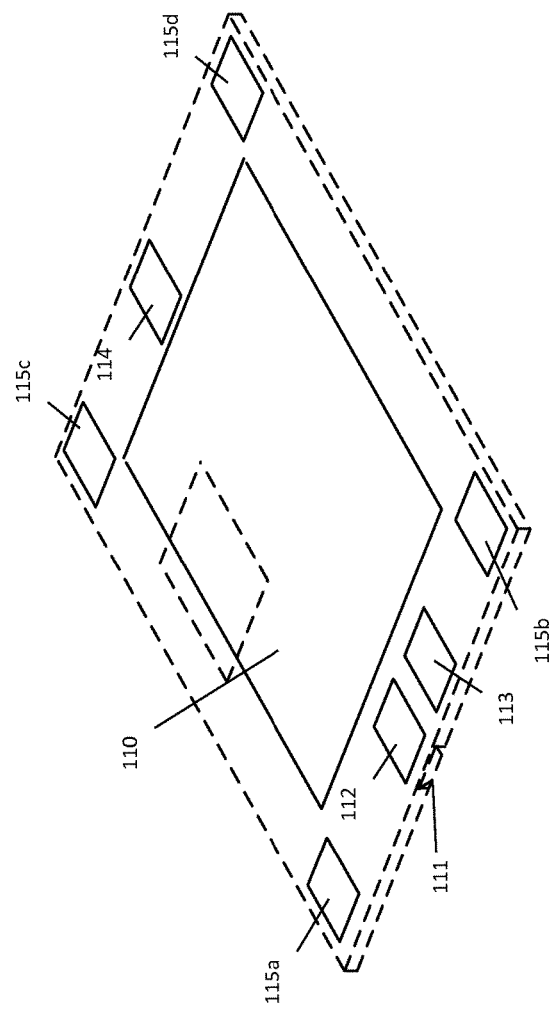

SECURED AND SEALED PORTABLE WIRELESS DATA STORAGE SYSTEM

CROSS-REFERENCE TO RELATED APPLICATIONS

This present disclosure claims the benefit of U.S. Provisional Application Ser. No. 61/983,906, filed on Apr. 24, 2014.

TECHNICAL FIELD

The present invention relates generally to the field of wireless data storage devices. Specifically the present invention relates to sealed flash storage enclosures with wireless charging and data transfer features.

BRIEF BACKGROUND

With the advancement of digital technology various forms of information can be recorded, stored and transported on portable storage mediums such as DVDs, memory sticks, jump drives and the like. As this technology has proliferated so has the consumption of digital information. Currently, users with internet access may consume digital media by streaming and/or downloading motion pictures, video clips, music, and even entire seasons of their favorite TV shows to their devices. In other exemplary use cases, such as Big Data applications, users need to have access to significant amounts of data in order to perform the required analysis. In further exemplary use cases, such as confidential health records, it is essential that patient information is available and used by medical professionals without compromising the patient's privacy and health data security. It is often the case that the owners of the said digital media or sensitive data want to be able to control and know who has access to such content.

Traditionally, in the case of online digital media, content owners have been able to control the access to their media or data by first storing the said data on remote servers and then only allowing authorized users to stream the digital media content without allowing the data to ever reside as a file on a clients machine (e.g. Hulu, Pandora, etc.). However, with the proliferation of smart phones and other portable devices such as tablets, and due to the unreliability of wireless internet connectivity, users are increasingly demanding greater storage capacity on devices so that they may store their favorite media locally. In other situations online streaming becomes impractical due in part to bandwidth demands of high-resolution standards such as Blu-Ray and 4 k media. For example, an uncompressed 4K movie can take up to 160 GB of data—even with generous broadband connectivity (i.e. +30 Mbps download speeds) such a download could take hours. This constraint has limited the proliferation of such high resolution content to the slow and antiquated distribution of physical disks such as Blu-Ray disks. Naturally in a world of on-demand media consumption waiting for a disk to be shipped over night is unpalatable. Some retailers such as Redbox have tried to meet the need by shipping movies to local kiosks so that customers may rent them out at their convenience. Other retailers such as Netflix mail disks directly to their customers' homes. Unfortunately such retailers are plagued by inventory and stocking problems due to the unpredictable demand of certain media.

Similarly in "Big Data" use cases it is often impractical for the owners of data to maintain control via a restricted access to a remote server. Often times users need to be able to quickly access the data with very high throughputs and ultra low latency—naturally network connectivity may not always allow for such performance.

Also, in patient health use cases it is sometimes not practical to use traditional storage means while still being compliant with HIPAA privacy protocols. Additionally, while it may be practical to securely host medical data and medical histories online it is not feasible to maintain and retrieve a patient's complete genomic sequence online—by some estimates a patient's complete genomic data—accounting for mutations—can require up to 1 terabyte of space.

Current high capacity storage devices, such as flash drives, offer a limited solution to the described needs because while such devices may be able to store large media files, and may also allow a user to quickly access the data, they unfortunately offer little to no protection in terms of digital rights management (DRM). Media and data on such storage devices are thus susceptible to piracy and unauthorized use because it is difficult to limit such use without using computational resources to enforce a cumbersome encryption/decryption regime.

Such high capacity storage devices present another weakness in that they lack portability. A major selling point of mobile devices is they're compact and have a sleek form factor—they are small with minimal amounts of ports and buttons. Currently, high capacity storage devices tend to be bulky and require cabling for data transfer and external power sources.

Therefore, due to the weakness of current data storage solutions, there is a current and impending need for a device that is portable, capable of high volumes of storage, capable of high-speed data transmission, and is secure. Additionally there is a need for a system that enables such a device to securely and effectively store and transport data.

SUMMARY OF THE INVENTION

Embodiments of the present invention provide a device, a system and methods for implementing high capacity data storage within a portable wireless device.

In a first embodiment, the present invention may include 1) a solid-state memory for on-device mass storage, and 2) a wireless transceiver capable of transmitting and receiving signals using protocols such as Wi-Fi, Wi-Gig, Bluetooth, NFC, cellular services such as LTE/GSM, and/or other proprietary wireless communication techniques. The present invention may also include a processor that may be combined with other hardware and controllers to enable security and data communication operations.

Another embodiment of the present invention may be a multiple input, multiple output (MIMO) storage device, in that a single storage device may be partitioned into multiple virtual devices, such that each virtual device may operate in parallel to increase throughput and speed of reading and writing operations. This may vary based upon the fabrication abilities and needs for the device.

In another embodiment of the present invention, power may be supplied via wireless sources compliant with standards such as Qi or A4WP. Alternatively, power may be supplied by an internal small form factor battery.

One embodiment of the present invention may have an external displays, such as LCD, OLED, E-paper or low power screens. Packaging for the device may be credit card size in length and width. The depth may be variable depending on features such as inclusion of internal power sources, external displays, or other considerations such as device capacity. In one embodiment, the package may be completely sealed without any visible connectors.

Applications for the device may include personal storage or general storage similar to how external hard drives are currently used. The present invention differs in that it is entirely self-contained and may include added security features such as secured key authentication, fingerprint identification, or the like before the device is usable.

The present invention may also be used in conjunction with a protective case for mobile devices. One benefit of the small form factor is that even when paired with a case for added protection, the form factor of the mobile device will not change much from a physical dimension perspective, nor from a weight perspective.

Another application for the present invention is video storage and kiosk based video rental systems. The present invention has a small form factor, high storage capacity and ability to send and receive information quickly. Accordingly, one application may be video storage. For example, a user may be able to visit a kiosk and transfer high quality video on to the storage device of the present invention quickly and with ease. Combined with compression standards and increased ability to store large quantities of data, the present invention may be utilized to replace presently available video disk rental kiosks.

Another application of the present invention may be the easy storage of mass amounts of data for "Big Data" applications. In one embodiment users may securely store, edit, and share large amounts of data without being limited to traditionally slow internet and ethernet networks or insecure flash drives and disks.

Another application of the present invention may be the easy storage of medical data such as medical history, complete DNA sequencing, or HIPPA compliant medical data. For medical applications a doctor's office or a medical lab may include a secured terminal to read such stored data.

BRIEF DESCRIPTION OF THE FIGURES

The invention is more fully appreciated in connection with the following detailed description taken in conjunction with the accompanying drawings, in which:

FIG. 1B depicts the external packaging shape and components of a wireless storage device which is powered via an inductive coil in accordance with one embodiment of the present invention.

FIG. 1C depicts the internal packaging shape and components of a wireless storage device which is powered via an inductive coil in accordance with one embodiment of the present invention.

FIG. 1D depicts the external packaging shape and components of a wireless storage device which is powered via an external power source in accordance with one embodiment of the present invention.

FIG. 1E depicts the internal packaging shape and components of a wireless storage device which is powered via an external power source in accordance with one embodiment of the present invention.

DETAILED DESCRIPTION

Figure 1A:
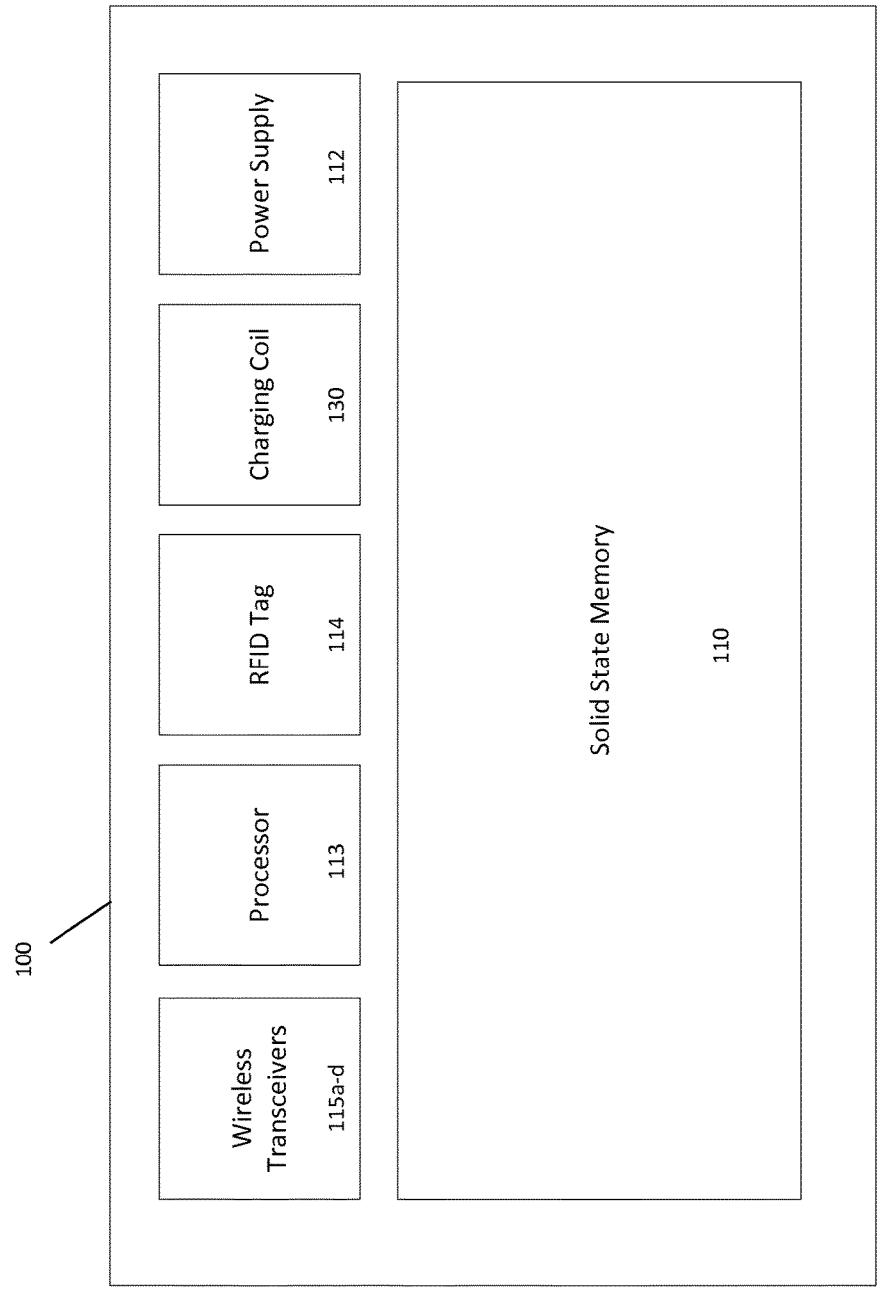
FIG. 1A is a block diagram of the components of a wireless storage device in accordance with one embodiment of the present invention.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Slim Form Factor and Sealed Enclosure

One of the key features of the present invention is its slim form factor and lack of data ports. FIG. 1A is a block diagram of the components of a wireless storage device in accordance with one embodiment of the present invention. Device 100 is comprised of multiple modules that enable it to function as a fully self-contained data storage and processing system.

The wireless transceiver modules 115a-d may comply with one of any number of standards including 802.11n/ac/ad (WiFi), Bluetooth, WiGig, or other proprietary protocols. In addition, having multiple transceivers within one module or distributed amongst multiple modules allows device 100 to take advantage of multiple input, multiple output (MIMO) functionalities. For example, wireless transceivers placed at each of four the corners of device 100 may be coordinated to allow for beam forming. Also, the device 100 may be equipped with cellular transceivers, such as those compatible with LTE, in order to enable mobile connectivity.

The solid-state memory 110 of device 100 may comprise of multiple flash chips that may have read speeds on the order of 400 mbit/s. These flash chips may either be addressable as one large memory or as multiple smaller partitioned memories. Such a configuration may allow for partitioned memories to be grouped with one of multiple transceivers 115a-d and thus allow for multiple independent streams of data communication. In such embodiments the device 100 the overall data throughput of the device may scale linearly with the number of wireless transceiver-memory partitions pairs that exist (i.e. doubling the number of transceivers-memory pairs may effectively double the data transfer rate of the device 100).

The processor 113, in device 100 must be powerful enough to act as a controller for data transfer, an engine for decryption/encryption of data, and a controller or handling security credentials. Generally speaking most low power ARM or Intel Atom microprocessors are more than capable to do the mentioned tasks. More powerful processors may be needed for more demanding tasks such as handling the streaming of digital media. Such tasks include buffering, compression, and decompression of high definition video and audio in accordance with standards such as VP9 and h265.

To power device 100 the charging coil 130 and power supply 112 must work in unison to ensure that ample power is supplied to the processors, transceivers, and memory during operation of the device. Charging coil 130 is designed to provide wireless power and may comply with standards such as Qi and A4WP. Power supply 112 may include a charge reservoir such as a rechargeable battery or super capacitors. While device 100 is designed to be powered wirelessly such charge reservoirs serve to buffer the supply of charge in order to minimize the effect of any interruptions in the transmission of wireless power. Furthermore such charge reservoirs may even allow the device 100 to operate for short durations without steady inductive power. If the power supply 112 determines that the inductive power from the charging coil is absent for too long, it will send an instruction to the processor 113 to perform a graceful power off in which the current state of device 100 is saved and the said device is shutdown.

Finally device 100 may also be equipped with near field communication (NFC) RFID tag 114. Such tags may include identification information pertaining to the device 100 and may be read using passive inductive methods and thus not need to use processor 113 resources.

FIG. 1B depicts the external packaging shape and components of a wireless storage device 100 which is powered via an inductive coil 130 in accordance with one embodiment of the present invention. Due to the compact nature of the solid-state electronics and due to the lack of external ports device 100 may be slimed down to the width and height dimensions of a credit card. An embodiment of the present invention may include a display 101 on a surface of the storage device 100 in order to give the devices' user visual status notifications. To minimize power consumption, display 101 may be a low power display such as E-paper or OLED.

Further, FIG. 1C depicts the internal packaging shape and components of a wireless storage device which is powered via an inductive coil 130. The largest amount of space is taken up by a solid-state memory 110. In addition multiple wireless transceiver modules 115a-d may be enclosed in the device as well. Ideally these transceivers 115a-d may be placed near the corners of the device 100 in order to minimize the electromagnetic interference between each respective module. Finally the device 100 also includes modules for the power supply 112, a processor 113, and an RFID tag 114. The location of these modules is not critical and may be placed wherever there is enough space.

In some circumstances it may be more suitable to power device 100 using a cable as a direct power source instead of an inductive power source. Accordingly, FIG. 1D depicts the external packaging shape and components of a wireless storage device which is powered via an external power source in accordance with one embodiment of the present invention. FIG. 1E depicts the internal packaging shape and components of a wireless storage device which is powered via an external power source in accordance with one embodiment of the present invention. In this embodiment it is possible to directly plug a power cable into device 100 via port 111. Port 111 may be one of a number of standards including mini/micro USB or a unique proprietary standard. Port 111 directly connects external power sources to the internal power supply module 112 and supplies the module with direct power.

Wireless Connectivity

Another key feature of the present invention is the ability of device 100 to handle all connectivity using wireless transceivers instead of traditional data cables. Depending on environmental conditions and the task at hand device 100, enabled by MIMO wireless transceivers, may be able to optimize its wireless emissions (i.e. beam forming) to either maximize signal strength in one direction or to maximize high throughput.

Figure 2A:
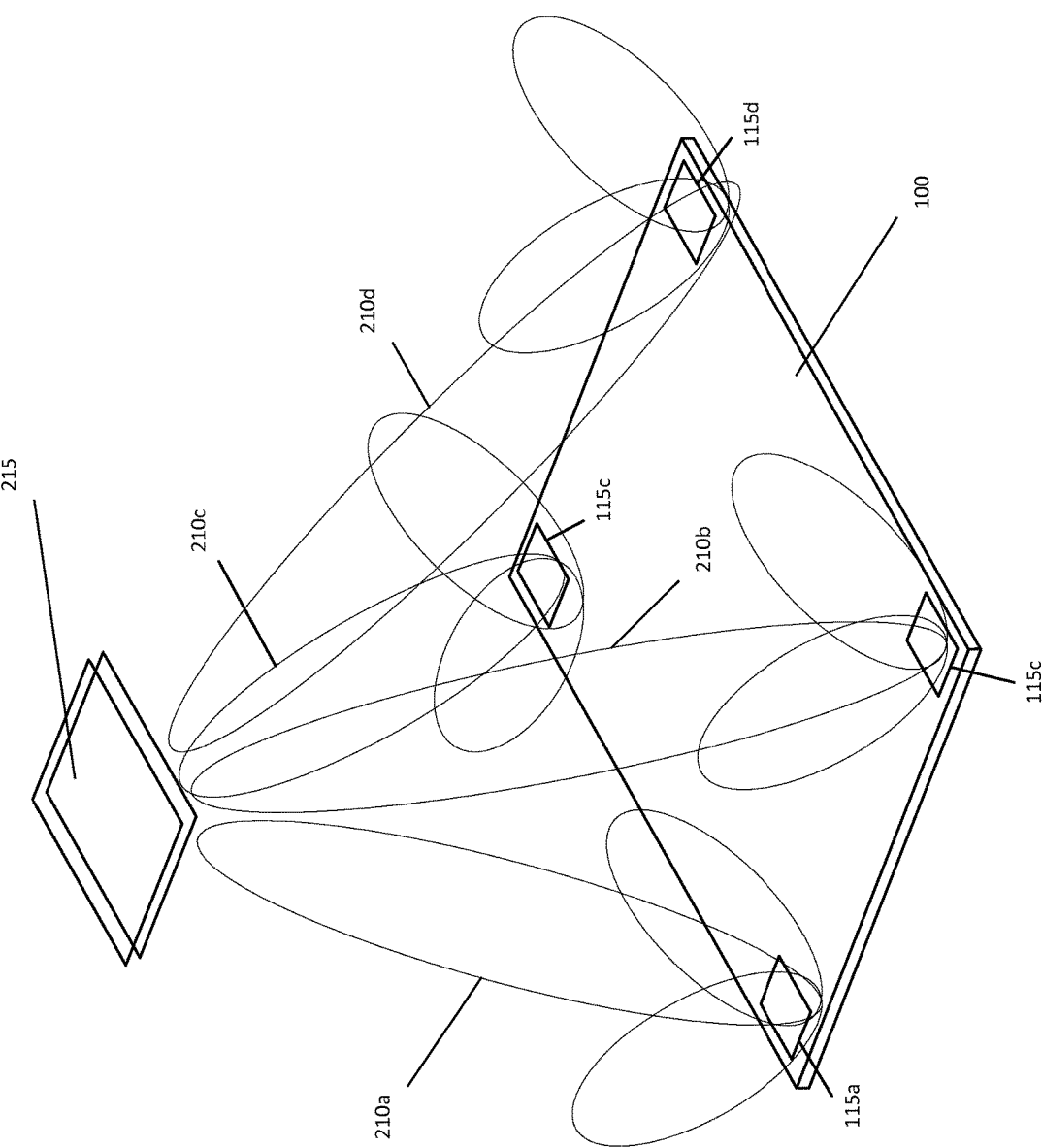
FIG. 2A illustrates the utilization of wireless beam forming in order to focus signal strength in order to maximize signal strength in one direction.

In some operation modes it may be important to ensure the maximum amount of signal is being transmitted and received by device 100. FIG. 2A illustrates the utilization of wireless beam forming in order to focus signal strength in order to maximize signal strength in one direction. In this instance device 100 has four sets of transceivers 115a-d, each residing in a corner of the packaging. Complementing device 100 is a transceiver 215 residing on a dock 400. During operation each of the transceivers 115a-d may utilize beam-forming techniques to maximize the signal strengths 210a-d that are directed towards the singular dock transceiver 215. While this method ensures that the maximum amount of signal strength 210a-d is transmitted to the dock's transceiver 215 it limits the speed at which data may be communicated since only one connection link formed (i.e. The four transceivers 115a-d act as a single transceiver and thus can only establish a single connection link with the dock transceiver 215).

Figure 2B:
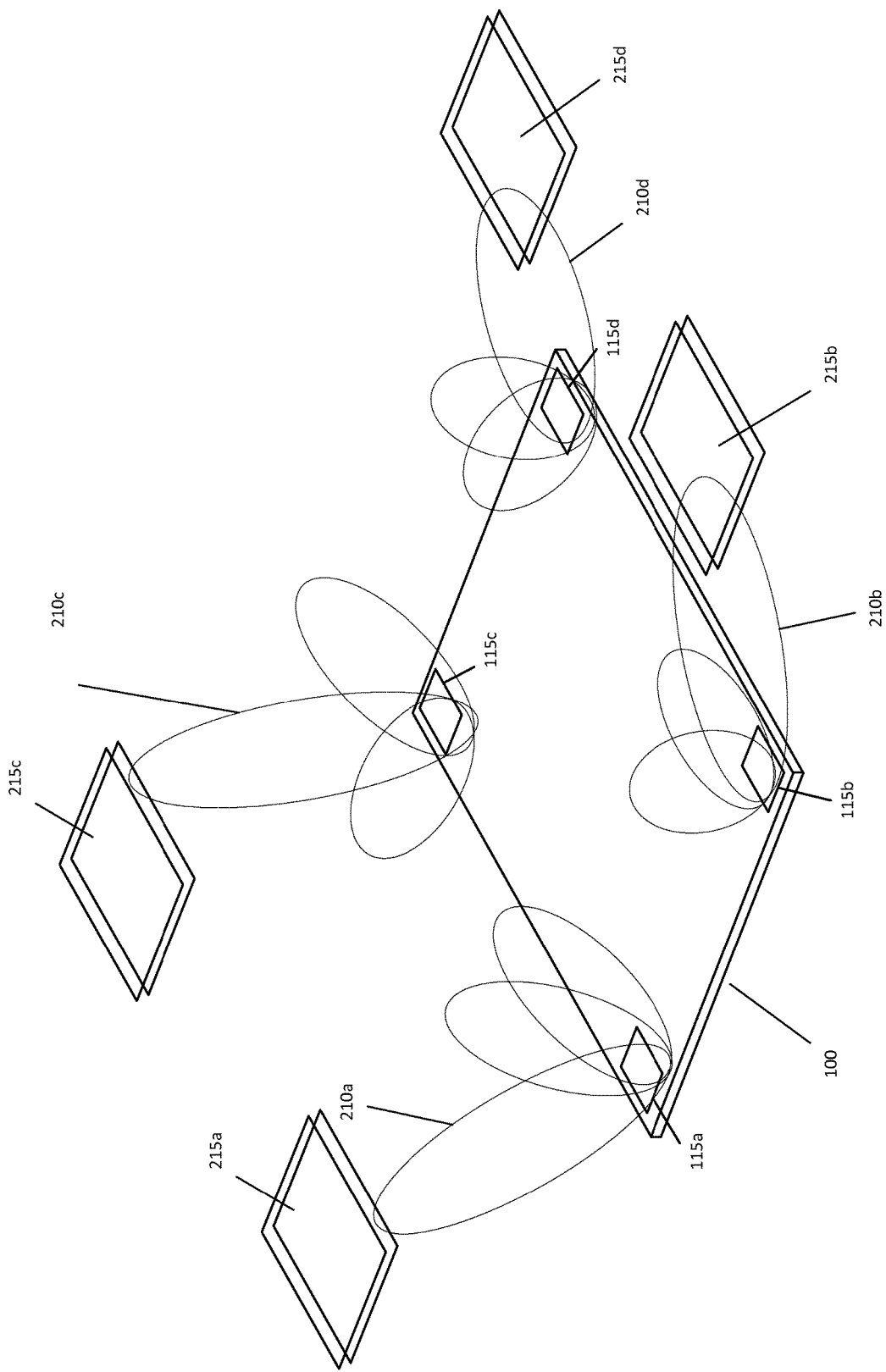
FIG. 2B illustrates the utilization of wireless beam forming in order to spread signal strength to distributed receivers minimize signal interference for parallel operations.

Yet in other operation modes it may be important to ensure the maximum amount of data throughput is sent and received by device 100. FIG. 2B illustrates the utilization of wireless beam forming in order to spread signal strength to distributed receivers minimize signal interference for parallel operations. In this instance device 100 again has four sets of transceivers 115a-d, each residing in a corner of the packaging. However, complementing device 100 are four transceivers 215a-d spread out on a dock 400. During operation transceivers 115a-d may utilize beam-forming techniques to maximize the respective signal strengths 210a-d that is directed towards each of the respective transceivers 215a-d on the dock 400. While this method ensures that each transceiver pair (i.e. 115a-d paired with 215a-d respectively) can each establish a connection link independently and maximize the amount of data that is exchanged in parallel, it also limits the signal strength 210a-d used in establishing each of the said links. Due to this signal strength limitation the dock 400 and device 100 will ideally be at a touching distance.

Wireless Charging

Figure 3:
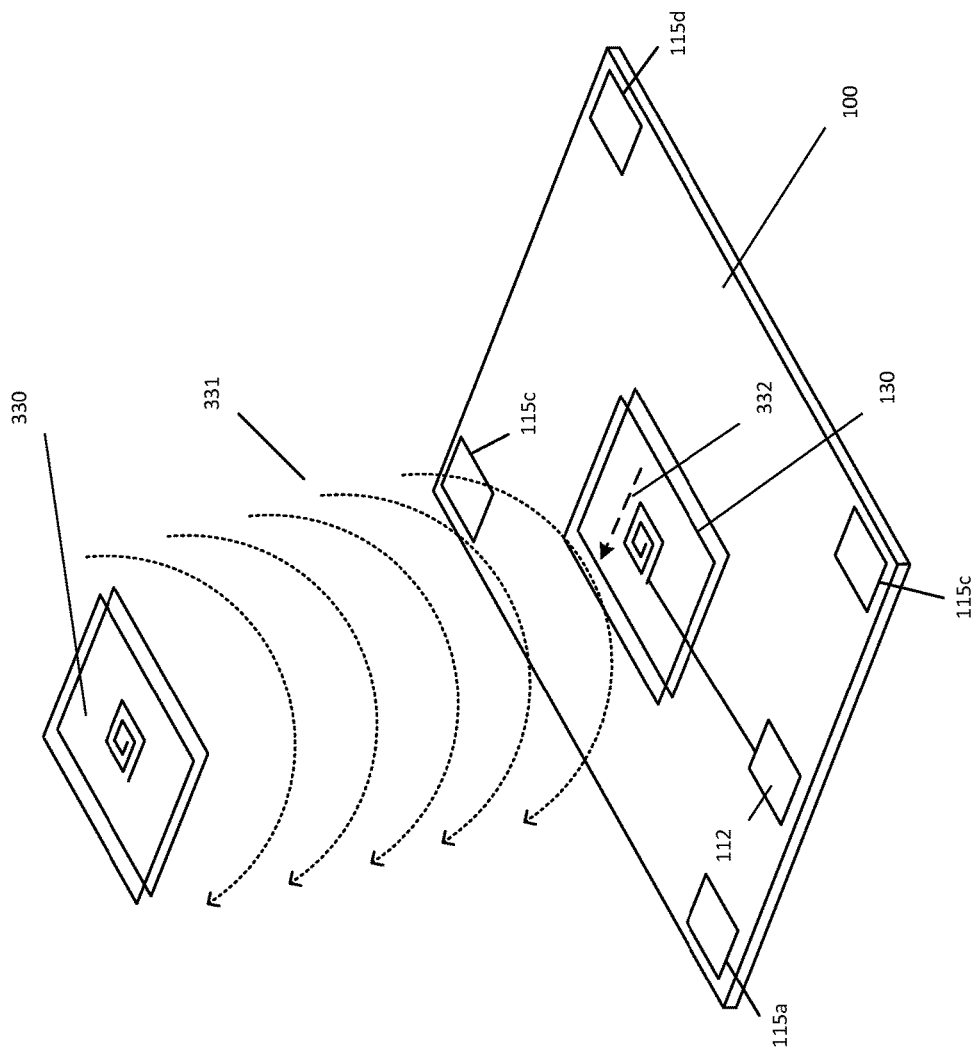
FIG. 3 illustrates the wireless charging aspect of a wireless storage device in accordance with one embodiment of the present invention.

Another key feature of the present invention is the ability of device 100 fully powered and charged via wireless power induction. FIG. 3 illustrates the wireless charging aspect of a wireless storage device in accordance with one embodiment of the present invention. In this instance an inductive coil 130 resides on device 100 and is coupled with a power supply 112. A similar inductive coil 330 resides on a dock 400 and is coupled with a typical AC power source such as a wall outlet or a battery coupled with a DC-AC inverter. When charging device 100 the coil 330 emits electromagnetic fields 331 that induce a current 332 in receiving coil 130. Current 332 is then regulated, and the charge may be stored, by the power supply 112 in order to supply power for the operation of all the other modules on device 100.

It should be noted that to minimize the electromagnetic interference with wireless transceivers 115a-d it is important for the frequency of the AC current powering inductive coil 330 be far away from the operating frequencies of the said transceivers. For example many WiFi protocols operate at a carrier frequency of 2.4 Ghz and 5 Ghz so an inductive coil resonating 915 Mhz would be far enough from the said carrier frequencies—and associated harmonic frequencies—to minimize any interference.

Data Docks and Stations

Figure 4A:
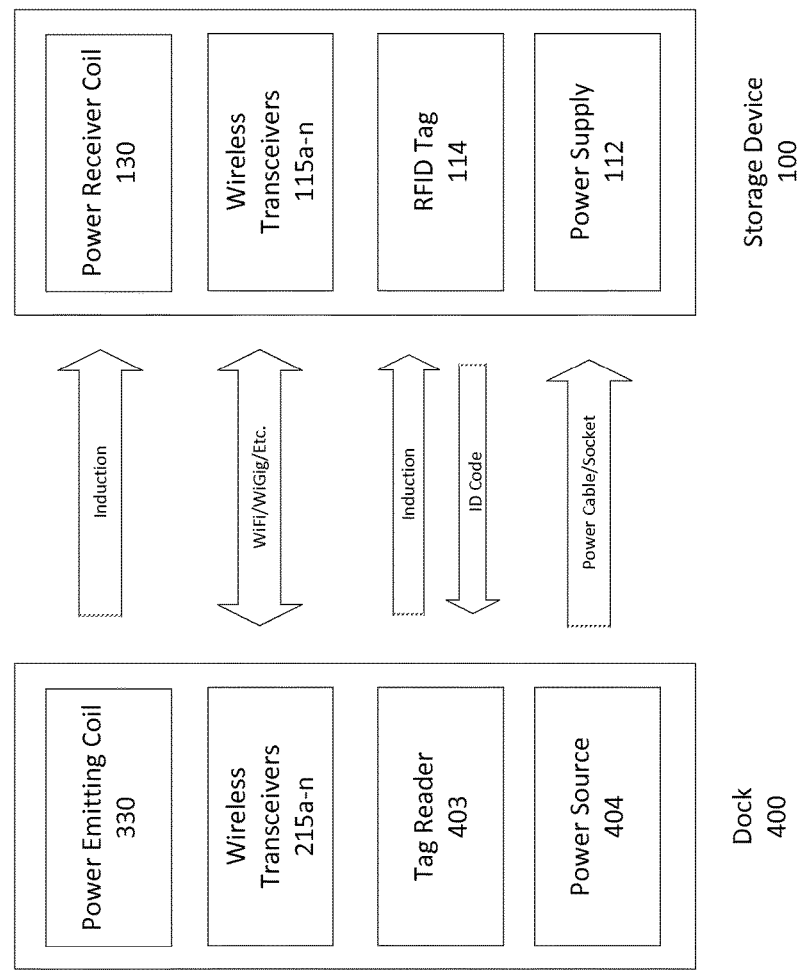
FIG. 4A illustrates the multiple components of a storage device, a dock and the combined system's respective connectivity in accordance with one embodiment of the present invention.

The storage device 100 of the present invention is designed to be used in conjunction with a compatible contactless docking station 400. Once placed at the dock 400 the device 100 may commence data transfer and inductive charging. FIG. 4A illustrates the multiple components of the storage device and dock and system's respective connectivity. As described earlier the power emitting coil 330 transfers power to the power receiver coil 130 via induction. Also, as previously described, dock wireless transceivers 215a-n communicate with device wireless transceivers 115 a-n via wireless communication protocols. Dock tag reader 403 induces current in the device RFID tag 114 and in return receives an ID code from the said device. Finally in cases where required, the docks power source 404 may be connected to the device power supply 112 in order to power or charge the device.

In one embodiment of the present invention device 100 may be wirelessly paired with a mobile device, such as a cellphone or a tablet, to provide additional storage capacity to the said mobile device. The device 100 may be housed in a protective case for mobile devices. One benefit of the small form factor is that even when paired with a case for added protection, the form factor of the mobile device will not change much from a physical dimension perspective, nor from a weight perspective. However since most cellphones and tablets have limited power sources of their own, and will often times not have power emitting coils 330, device 100 may need to connect to an independent power source such as, but not limited to, a powered USB cable using port 111 for extended operation.

Figure 4B:
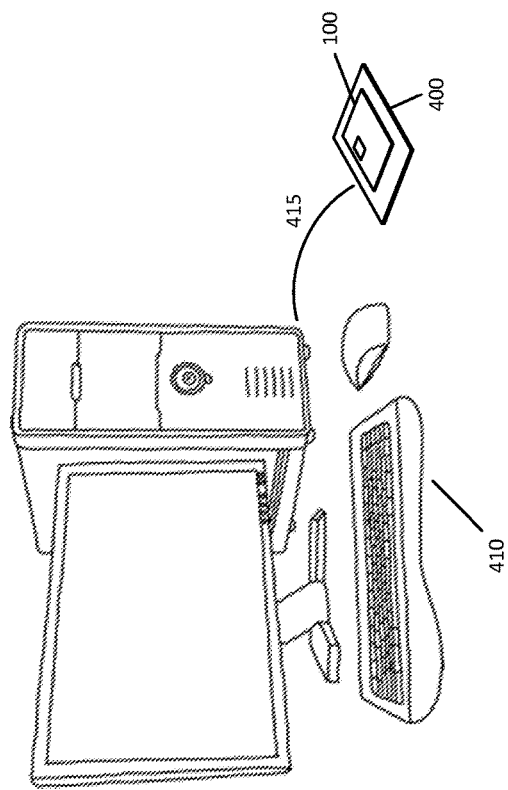
FIG. 4B illustrates the use of a wireless storage device for reading and writing computer readable data.

Another embodiment of the present invention involves the use of device 100 as secured memory storage for a computer. FIG. 4B illustrates the use of a wireless storage device for reading and writing computer readable data. Dock 400 may be connected to a computer terminal 410 via a high throughput data communication port 415 such as high speed USB, FireWire, or the like. Device 100 may be placed on the dock 400 when a user wants to view, add or remove data from the said device.

Use cases for such a set up include applications in which sensitive data is stored on device 100 and is only accessible when an authorized users enter their respective credentials on computer terminal 410. Once the valid credentials are entered dock 400 may unlock device 100 and allow for read/write access to the authorized users.

Such systems may also be used to carry confidential health records. In one instance a computer terminal 410 in a doctor's office, hospital, or medical lab may be able to access a patients medical records and genomic information on a secured storage device 100. Because only users with proper authorized credentials can access the data a patient can rest assured that their privacy is secure.

Figure 4C:
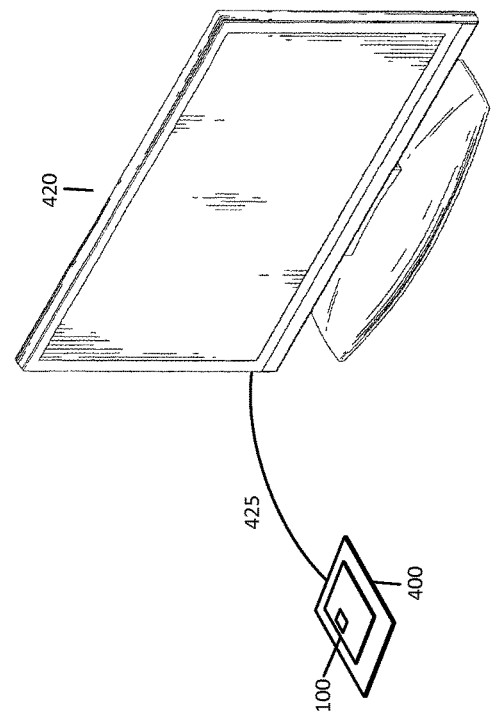
FIG. 4C illustrates the use of a wireless storage device for viewing and storing digital media.

Another embodiment of the present invention involves the use of device 100 as secured media storage for playback on multimedia system. FIG. 4C illustrates the use of a wireless storage device for viewing and storing digital media. Dock 400 may be connected to a multimedia system 420, such as a television, via a high throughput multimedia port 425 such as HDMI or the like. Device 100 may be placed on the dock 400 when a user wants to view, add or remove media from the said device.

Use cases for such a set up include applications in which users may have media stored on device 100 and is only accessible when an authorized users enter their respective credentials on computer terminal 410. Once the valid credentials are entered dock 400 may unlock device 100 and allow for view/store access to the authorized users.

Data Kiosk

As discussed earlier it is sometimes impractical to transfer large amounts of data over "last mile" internet networks. In one embodiment of the present invention owners of digital content (i.e. high definition movies, large apps and video games, etc) may be able to distribute their content via a network of kiosks connected to high throughput internet backbones.

Figure 5:
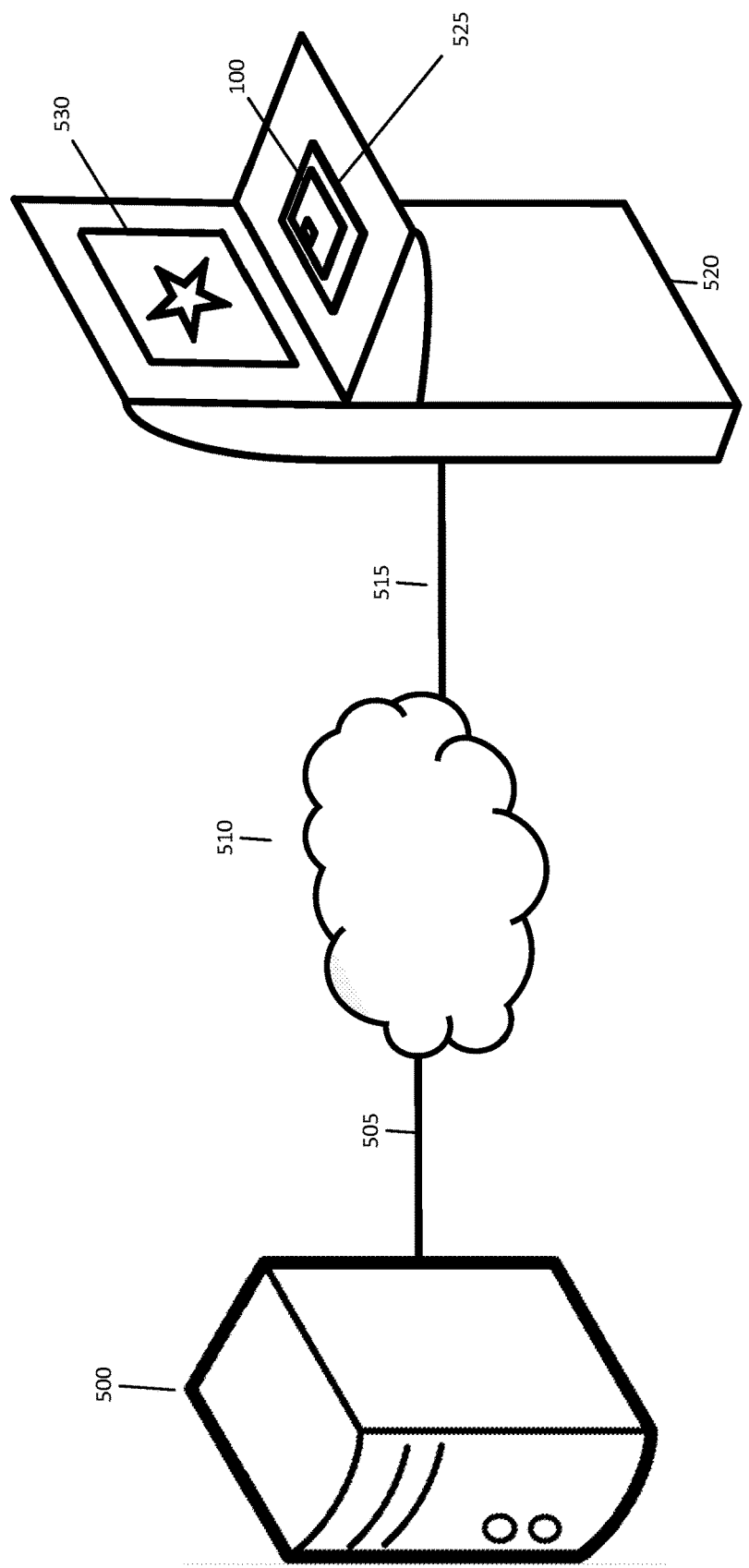
FIG. 5 illustrates a retail kiosk that can quickly transfer data into a storage device.

FIG. 5 illustrates a retail kiosk that can quickly transfer data into a storage device. In this instance digital content owners may be able to host their data on their servers 500 and have it connected to the internet 510 via a high throughput connection 505 (e.g. a fiber optic connection). On the other end retail kiosks 520 be similarly be connected to the internet via high throughput connections 515 enabling them to regularly sync with the content stored on the main server 500. When interfacing with kiosk 520 users may place their storage devices 100 on retail dock 525 and select the media they would like to purchase via a user interface 530. The present method offers significant advantages over traditional disk rental kiosks (e.g. Redbox). For example, since the kiosk 520 of the present invention does not need to maintain an inventory for the distribution content because the said kiosks can be remotely synchronized with a central repository. Also, because kiosk 520 can encode limitations on the right to use data on device 100 there is no need for users to have to return any media.

Security

Figure 6:
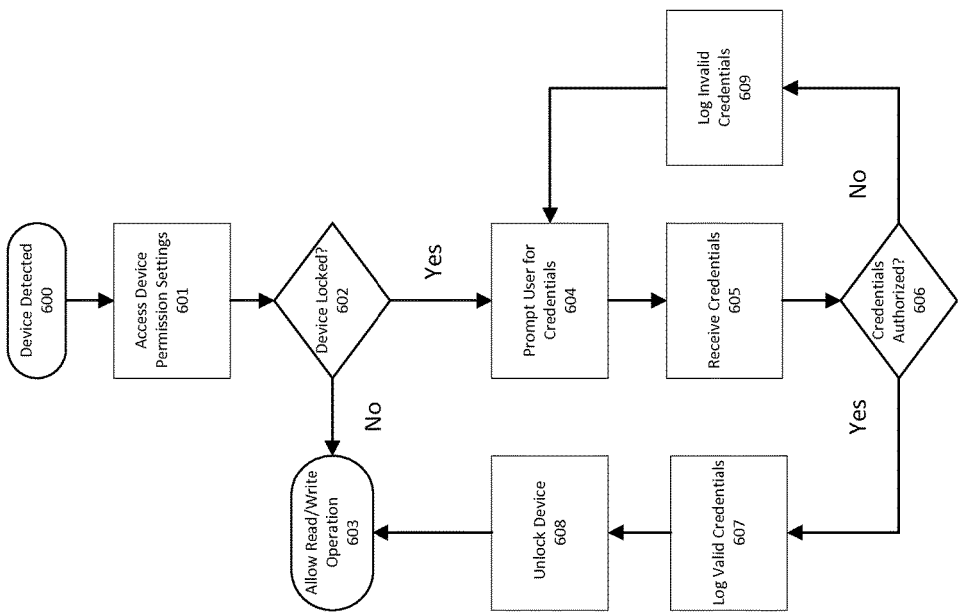
FIG. 6 is a flow chart illustrating exemplary steps for authorizing the use of the storage device in one embodiment of the present invention.

An important functionality of the present invention is the degree of control afforded to owners of data. In one embodiment of the present invention owners of data are able to select exactly who is allowed to read and write to. FIG. 6 is a flow chart illustrating exemplary steps for authorizing the use of the storage device in one embodiment of the present invention.

When a new device 100 is detected 600 at a dock 400 the station will first access the permission settings on the device 601. The system then checks to see whether or not the device has been locked 602. If the device is not locked the user will be allowed to read and write to the device 603. However if the device is locked the user will be prompted to enter proper credentials 604. To proceed the user must enter credentials that are unique to the user 605. The system then checks to see if the user, with the given credentials, is authorized to access the storage device 606. If the credentials are valid they will be logged into the system 607. Based on the given credentials the device will be either partially or fully unlocked 608 and the user will be allowed to either perform read/write 603 operations on some or all of the memory within the device. If however at step 606 the user's credentials are not authorized the system will log the invalid credentials 609 and prompt the user to enter credentials again 604.

What is claimed is:

1. A method for storing large amounts of data on a wireless device, said method comprising the steps of:
    placing a wireless device on a wireless transmission unit, wherein the wireless device comprises a wireless power source that is a small form factor battery that is 0.3 mm to 0.5 mm wide and has a capacity of at least 120 mA;
    initializing the wireless device for transmission of data;
    authenticating the wireless device with an associated account or profile;
    verifying the storage capacity of the wireless device;
    determining what wireless standard is implemented by the device; and
    transmitting data to the wireless device;
    whereby the transmitted data is available to be later viewed and or accessed locally from the wireless device.

2. The method of claim 1, wherein data uploaded to said wireless device is performed at a remote facility, wherein the remote facility is a kiosk.

3. The method of claim 2, wherein said data associated with said wireless device comprises media capable of playback.

4. The method of claim 3, wherein said wireless transmission unit further serves as a wireless charging station.

5. The method of claim 1, further comprising the steps of:
    charging the wireless device to increase the stored amount of power; and
    updating the associated account to reflect most recent transfer or access of data.

6. A portable system for personal data storage comprising:
    a wireless transceiver;
    flash storage;
    a processor;
    a wireless power source, wherein the wireless power source is a small form factor battery that is 0.3 mm to 0.5 mm wide and has a capacity of at least 120 mA; and
    an enclosure that is completely sealed without any ports.

7. The portable system of claim 6, further comprising an external display.

8. The portable system of claim 7, wherein the wireless power source comprises of either Qi or A4WP.

9. The portable system of claim 6, wherein the entire enclosure is hermetically sealed and self-contained.

10. The portable system of claim 7, wherein the external display is an LCD, OLED, or lower power screen.

11. The portable system of claim 6, further comprising a Bluetooth communication device.

12. The portable system of claim 6, further comprising a fingerprint scanner.

13. A method of wirelessly charging and wirelessly transferring significant amounts of playback capable media, comprising the steps of:
    placing a wireless device on a wireless transmission unit;
    authenticating a wireless device based on device information and associated user profile;
    determining an amount of available storage;
    charging the wireless device, wherein the wireless device comprises a wireless power source that is a small form factor battery that is 0.3 mm to 0.5 mm wide and has a capacity of at least 120 mA;
    receiving, via at least one wireless transmission unit, communication signals from at least one transceiver;
    uploading requested information for playback.

14. The method of claim 13, further comprising the step of updating a user profile based on updated media information.

* * * * *